United States Patent
Bernath

(10) Patent No.: US 12,311,616 B2
(45) Date of Patent: May 27, 2025

(54) METHOD AND APPARATUS FOR PRODUCING AN ENDLESS SEMI-FINISHED PRODUCT, ENDLESS SEMI-FINISHED PRODUCT, DOWNHOLE HEAT EXCHANGER, BOREHOLE REINFORCEMENT AND RESTORATION PIPE

(71) Applicant: TTS INOVA AG, Thayngen (CH)

(72) Inventor: Simon Bernath, Thayngen (CH)

(73) Assignee: TTS INOVA AG, Thayngen (CH)

( * ) Notice: Subject to any disclaimer, the term of this patent is extended or adjusted under 35 U.S.C. 154(b) by 711 days.

(21) Appl. No.: 17/255,697

(22) PCT Filed: Jul. 31, 2019

(86) PCT No.: PCT/EP2019/070718
§ 371 (c)(1),
(2) Date: Dec. 23, 2020

(87) PCT Pub. No.: WO2020/025720
PCT Pub. Date: Feb. 6, 2020

(65) Prior Publication Data
US 2021/0283864 A1    Sep. 16, 2021

(30) Foreign Application Priority Data

Jul. 31, 2018  (EP) .................................... 18186624

(51) Int. Cl.
*B29C 70/08*    (2006.01)
*B29C 70/52*    (2006.01)
(Continued)

(52) U.S. Cl.
CPC ............ *B29C 70/086* (2013.01); *B29C 70/52* (2013.01); *B29D 23/001* (2013.01); *B29K 2683/00* (2013.01)

(58) Field of Classification Search
CPC ..... B29C 70/086; B29C 70/52; B29D 23/001; Y02E 10/10; B29K 2683/00
See application file for complete search history.

(56) References Cited

U.S. PATENT DOCUMENTS 5,192,476 A  *  3/1993  Green ..................... B29C 63/10
                                                        264/137
10,767,903 B2      9/2020  Broder
(Continued)

FOREIGN PATENT DOCUMENTS

CA         2292822 A1     6/2000
CH          711385 A2  *  1/2017 ............. B29C 63/36
(Continued)

OTHER PUBLICATIONS

International Search Report for PCT/EP2019/070718, Prepared by the European Patent Office, mailing date Oct. 14, 2019, 4 pages.

*Primary Examiner* — S. Behrooz Ghorishi
(74) *Attorney, Agent, or Firm* — Brooks Kushman P.C.

(57) ABSTRACT

Method which is intended for producing an endless semi-finished product and having the following steps: feeding a silicone tube and a separate internal conductor, wherein the internal conductor runs in a first interior space formed by the silicone tube; encasing the fed silicone tube by production of an endless fibre tube, which encloses the silicone tube from the outside. The silicone tube is expanded so that a gap is formed between the silicone tube and the endless fibre tube. A matrix material is feed into the gap connecting the silicone tube and the endless fibre tube by virtue of the matrix material being cured.

9 Claims, 3 Drawing Sheets

(51) Int. Cl.
    *B29D 23/00*         (2006.01)
    *B29K 683/00*       (2006.01)

(56) References Cited

U.S. PATENT DOCUMENTS

2020/0025419 A1* 1/2020 Sakai .................. F24T 10/20
2022/0186427 A1* 6/2022 Feng .................... D04H 3/07

FOREIGN PATENT DOCUMENTS

| | | | | |
|---|---|---|---|---|
| DE | 102012201262 A1 | * | 8/2013 | ........... B29C 70/521 |
| DE | 102013205089 A1 | | 9/2014 | |
| KR | 20100133682 A | | 12/2010 | |
| WO | 2013/170389 A2 | | 11/2013 | |
| WO | 2017/016790 A1 | | 2/2017 | |

* cited by examiner

METHOD AND APPARATUS FOR PRODUCING AN ENDLESS SEMI-FINISHED PRODUCT, ENDLESS SEMI-FINISHED PRODUCT, DOWNHOLE HEAT EXCHANGER, BOREHOLE REINFORCEMENT AND RESTORATION PIPE

CROSS-REFERENCE TO RELATED APPLICATION

This application is the U.S. national phase of PCT Application No. PCT/EP2019/070718 filed on Jul. 31, 2019, which claims priority to EP Patent Application No. 18186624.5 filed on Jul. 31, 2018, the disclosures of which are incorporated in their entirety by reference herein.

DESCRIPTION

The invention relates to a method and a device for producing a continuous semifinished product, a continuous semifinished product, a downhole heat exchanger, a borehole reinforcement and a restoration pipe.

PRIOR ART

The consequence of increasing congestion in the construction of housing estates is that structures are frequently also erected in areas in which groundwater is present. In order to heat and cool buildings in an energy-efficient manner, and in particular also in order to reduce $CO_2$ emissions, heat generation and/or refrigeration by means of heat pumps using downhole heat exchangers is increasingly gaining in importance. Such downhole heat exchangers necessitate a borehole in the ground with a depth of usually 50 m to 500 m. In order to protect the groundwater, however, extremely strict regulations exist, the consequence of which is that the erection of downhole heat exchangers in areas in which groundwater is present is usually not permitted. There is thus a need for a cost-effective system that eliminates the risk of contaminating the groundwater or other types of contamination owing to structures, in particular downhole heat exchangers, that reach below the earth's surface.

Document WO2013/170389A2 discloses a downhole heat exchanger having an expandable tubular casing. Said casing has a limited permeability to water such that a liquid that circulates inside the downhole heat exchanger would contaminate the groundwater. Document WO2017/016790A1 likewise discloses a downhole heat exchanger. Said downhole heat exchanger also cannot ensure guaranteed impermeability to water and/or liquid. Document DE102012201262A1 discloses a method for producing strong, dimensionally stable hollow profiles. Such dimensionally stable hollow profiles are not suitable as downhole heat exchangers. There is thus still the need for a secure and cost-effective system which is suitable for downhole heat exchangers and other civil engineering structures, and in particular for civil engineering structures in an area in which groundwater is present.

SUMMARY OF THE INVENTION

An object of the present invention is to provide a method and a device for producing a continuous semifinished product, a continuous semifinished product, a downhole heat exchanger, borehole reinforcement and a restoration pipe, in which the disadvantages of the prior art are resolved.

Said object is achieved by a method having the features according to claim 1. The object is also achieved by a continuous semifinished product which is produced by the method according to the invention. The object is also achieved by a downhole heat exchanger, a borehole reinforcement or a restoration pipe comprising the continuous semifinished product.

The object is in particular achieved by a method for producing a continuous semifinished product, which method comprises:
- supplying a silicone hose and a separate inner conductor, wherein the inner conductor runs in a first interior space formed by the silicone hose;
- encasing the supplied silicone hose by producing a continuous fiber hose that encloses the silicone hose on the outside;
- spreading open the silicone hose so that a gap is formed between the silicone hose and the continuous fiber hose;
- supplying a matrix material into the gap; and
- bonding the silicone hose and the continuous fiber hose by hardening the matrix material.

The object is additionally in particular achieved by a device for producing a continuous semifinished product, comprising:
- a conveying device for supplying a silicone hose and an inner conductor arranged inside the silicone hose;
- a bonding device for bonding a plurality of fibers to form a continuous fiber hose, and for encasing the supplied silicone hose with the continuous fiber hose;
- a spreading device for opening out the silicone hose and for reducing a gap between the continuous fiber hose and the silicone hose;
- a supplying device for supplying a liquid bonding agent into the gap; and
- a crosslinking device for crosslinking the bonding agent and for bonding the silicone hose to the continuous fiber hose.

The continuous semifinished product according to the invention has the advantage that the silicone hose and preferably of course also the continuous fiber hose which encases the silicone hose, as well as the matrix material which bonds the silicone hose and the continuous fiber hose, consist only of materials which are safe from a water protection perspective. Said materials are preferably food-safe and/or food-conforming. Because the silicone hose is produced in a first method step, separately from the continuous fiber hose, it can be checked and/or ensured that the silicone hose is fluid-tight already during the production thereof. The subsequent method step of encasing the silicone hose with the continuous fiber hose no longer influences the fluid-tightness, in particular the liquid-tightness, of the silicone hose. Consequently, in the continuous semifinished product according to the invention, it is ensured that the interior space formed by the silicone hose is separated from its exterior space in an absolutely water-tight and/or fluid-tight manner. A final product produced from the continuous semifinished product, such as for example a downhole heat exchanger, a borehole reinforcement or a restoration pipe can thus also be used in civil engineering structures without problems, in particular for components which come into direct contact with groundwater. Thus, for example, it is possible to guarantee the water-tightness of the downhole heat exchanger, for which reason it is possible to use the downhole heat exchanger according to the invention safely in the long term even in areas in which groundwater is present. If required, it is also possible to obtain official authorizations for the final products according to the invention that permit their use in areas in which groundwater is present.

The final products produced from the continuous semifinished product according to the invention can of course also be used in areas in which groundwater is not present, which results in the advantage that such products can be used substantially throughout in construction, irrespective of the presence of water, and therefore products which are different can be dispensed with, which permits more cost-effective production and significantly more favorable marketing.

The continuous semifinished product according to the invention is produced substantially by two partial methods: a first partial method, by which a silicone hose and an inner conductor arranged therein are produced, and a second partial method, in which a continuous fiber hose which encloses the silicone hose in the circumferential direction is applied around said silicone hose and the silicone hose is bonded on its outer side to the continuous fiber hose. The silicone hose is produced by means of an extrusion method, this production method ensuring that the silicone hose produced is fluid-tight.

A silicone hose is understood to mean a hose consisting of silicone, with silicone being referred to more precisely in chemical terms as poly(organo)siloxanes, a designation for a group of synthetic polymers in which silicon atoms are bonded via oxygen atoms. Such a silicone hose has the advantage that it is temperature-resistant, flexible, weather-resistant and aging-resistant, and additionally resists degradation and degrades in a non-toxic manner. Such a silicone hose has high dielectric strength, is resistant to dilute acids and alkalis, is food-safe and/or food-conforming and ozone-resistant, and therefore also does not discharge any contaminating substances into the environment, in particular into any groundwater present. By contrast to other food-safe plastics, such as for example polyethylene (PE) or polypropylene (PP) or polytetrafluoroethylene, which are relatively firm and rigid, silicone is a material which remains elastic.

A fiber hose is understood to mean a hose produced from fibers. The fibers used comprise, for example, polyester, polyamide, polyethylene or aramid and consist particularly advantageously of polyester. The fiber hose can be produced by weaving, braiding, knitting by loop forming or knitting by loop drawing. It is particularly advantageous if the fiber hose is produced as a continuous fiber hose by means of a circular loom. For this purpose, the silicone hose is inserted into the center of the circular loom and the continuous fiber hose is produced running along the outer surface of the silicone hose, with the result that the continuous fiber hose forms a woven fabric which surrounds the silicone hose in the circumferential direction.

The silicone hose has in particular the function of ensuring the fluid-tightness, in particular the water-tightness. The continuous fiber hose which encloses the silicone hose has in particular the function of receiving and retaining the forces acting on the wall of the silicone hose. In addition, the continuous fiber hose has for example the function of protecting the outer skin of the silicone hose from mechanical damage. The elastic properties of the silicone hose result in the advantage that it can be spread without problems during the manufacture of the continuous semifinished product according to the invention, in particular in order to bond the outer surface of the silicone hose to the continuous fiber hose, preferably over its surface area. The elasticity of the silicone hose thus ensures that it does not tear during the bonding to the continuous fiber hose, and that the silicone hose can be flexibly adapted with respect to manufacturing tolerances of the continuous fiber hose, and therefore it is ensured that the silicone hose is fluid-tight even when the continuous semifinished product is finished. Should the silicone hose not be bonded to the continuous fiber hose all over its surface area, the elastic properties of the silicone hose result in the advantage that the silicone hose expands under an existing internal pressure until the silicon hose bears against the inner side of the continuous fiber hose, such that the pressure acting in the interior of the silicone hose is transmitted reliably to the continuous fiber hose via the silicone hose wall, without the risk that the silicone hose could develop impermissible thin points or even tear. The combination of silicone hose and continuous fiber hose ensures that the continuous semifinished product according to the invention is reliably fluid-tight in the long term, that it is food-conforming, that it can also withstand a relatively high internal pressure of for example up to 120 bar or up to 200 bar, and that it can also be used in harsh construction environments. The continuous semifinished product according to the invention is thus best suited for producing a downhole heat exchanger, such a downhole heating exchanger and/or the continuous semifinished product used for this purpose preferably having a length in the range of between 50 m and 500 m.

The silicone hose and the continuous fiber hose are bonded preferably in such a way that a matrix material, preferably silicone, is introduced into a gap formed between the silicon hose and the continuous fiber hose, and the matrix material is subsequently hardened, preferably by the matrix material, the continuous fiber hose and the silicone hose being heated along a certain hardening length immediately after the supplying of the matrix material. It is advantageous if the silicone hose is opened out at least in the region of the gap by a spreading device arranged preferably inside the silicone hose, such that the gap formed is reduced and the outer side of the silicone hose can be bonded more securely to the inner side of the continuous fiber hose.

In a further advantageous configuration, the outer side of the continuous fiber hose can additionally also be provided with a layer, preferably with a coating material comprising at least one of the coating materials silicone, polyurethane or polyurea.

The continuous semifinished product produced by the method according to the invention can be processed further in a simple manner to form products such as a downhole heat exchanger, a borehole reinforcement or a restoration pipe. In the case of a continuous semifinished product which is used for downhole heat exchangers, the silicone hose has an internal diameter in the range of from preferably 10 cm to 15 cm. In the case of a continuous semifinished product which is used for a borehole reinforcement, the silicone hose has an internal diameter in the range of from preferably 15 cm to 25 cm. In the case of a continuous semifinished product which is used for a restoration pipe, the silicone hose has an internal diameter in the range of from preferably 10 cm to 100 cm.

It is particularly advantageous if the continuous semifinished product is processed further to form a downhole heat exchanger. The downhole heat exchanger is produced by the continuous semifinished product being cut to a required length, usually in the range of from 50 to 500 m, and the front end of the continuous semifinished product being closed in a fluid-tight manner. This downhole heat exchanger can then be introduced and lowered into a borehole and subsequently unfolded in the borehole by way of a fluid supplied through the inner conductor under pressure.

After this, the inner conductor is preferably withdrawn and replaced by a fluid line which preferably comprises a thermal insulation means. This fluid line can advantageously have a rigid configuration. After the fluid line has been introduced, the downhole heat exchanger is ready for operation. The downhole heat exchanger can be used for heat recovery or for cooling, depending on the requirement. For the purpose of cooling, for example in summer, a fluid is supplied as far as the region of the tip of the downhole heat exchanger inside the insulated fluid line, this fluid subsequently being conveyed upward again in the intermediate space between the insulated fluid line and the silicone hose, and cools down in the process. For the purpose of heat recovery, for example in winter, fluid is conveyed downward in the intermediate space between the insulated fluid line and the silicone hose as far as approximately the region of the tip of the downhole heat exchanger, the fluid that flows downward being heated by the borehole. The fluid enters the interior space of the insulated fluid line preferably in the region of the tip of the downhole heat exchanger, and is conveyed upward again inside the fluid line.

The inner conductor of the continuous semifinished product is preferably configured as an impermeable, flexible woven hose consisting of polyester.

It is particularly advantageous if the continuous semifinished product is also processed further to form a borehole reinforcement. The borehole reinforcement is produced by the continuous semifinished product being cut to a required length, usually in the range of from 50 to 100 m, and the front end of the continuous semifinished product being closed in a fluid-tight manner. This downhole heat exchanger can then be introduced and lowered into a borehole and subsequently unfolded in the borehole by way of a fluid supplied through the inner conductor. After this, the borehole reinforcement can be filled with a substance such as for example concrete, it being possible for the inner conductor either to be withdrawn completely or to remain in the concrete. The inner conductor can additionally comprise for example sensors and/or electrical conductors, and/or can comprise for example an inlet and outlet for a liquid, in order to use the borehole reinforcement, which is e.g. configured as a concrete pillar or some other pillar, for example additionally as a downhole heat exchanger. A borehole reinforcement comprising the continuous semifinished product according to the invention has the advantage that any groundwater present is not contaminated by the borehole reinforcement and/or by the objects and substances located inside the borehole reinforcement.

It is particularly advantageous if the continuous semifinished product can also be processed further to form a restoration pipe. The restoration pipe is produced by the continuous semifinished product being cut to a required length, usually in the range of between 50 and 1000 m, or in the range of between 50 and 500 m, and the front end of the continuous semifinished product is closed in a fluid-tight manner. This restoration pipe can be drawn into an existing pipe to be restored, for example a horizontally running fresh-water line, and subsequently unfolded in the pipe to be restored by way of a fluid supplied through the inner conductor. After this, the front and the rear end of the restoration pipe can be connected to a water line, the water subsequently running along the restored piece through the restoration pipe, the restoration pipe preferably being held open by virtue of the water pressure.

BRIEF DESCRIPTION OF THE DRAWINGS

In the drawings which are used to explain the exemplary embodiments.

In principle, identical parts are provided with the same reference signs in the drawings.

WAYS OF IMPLEMENTING THE INVENTION

Figure 1:
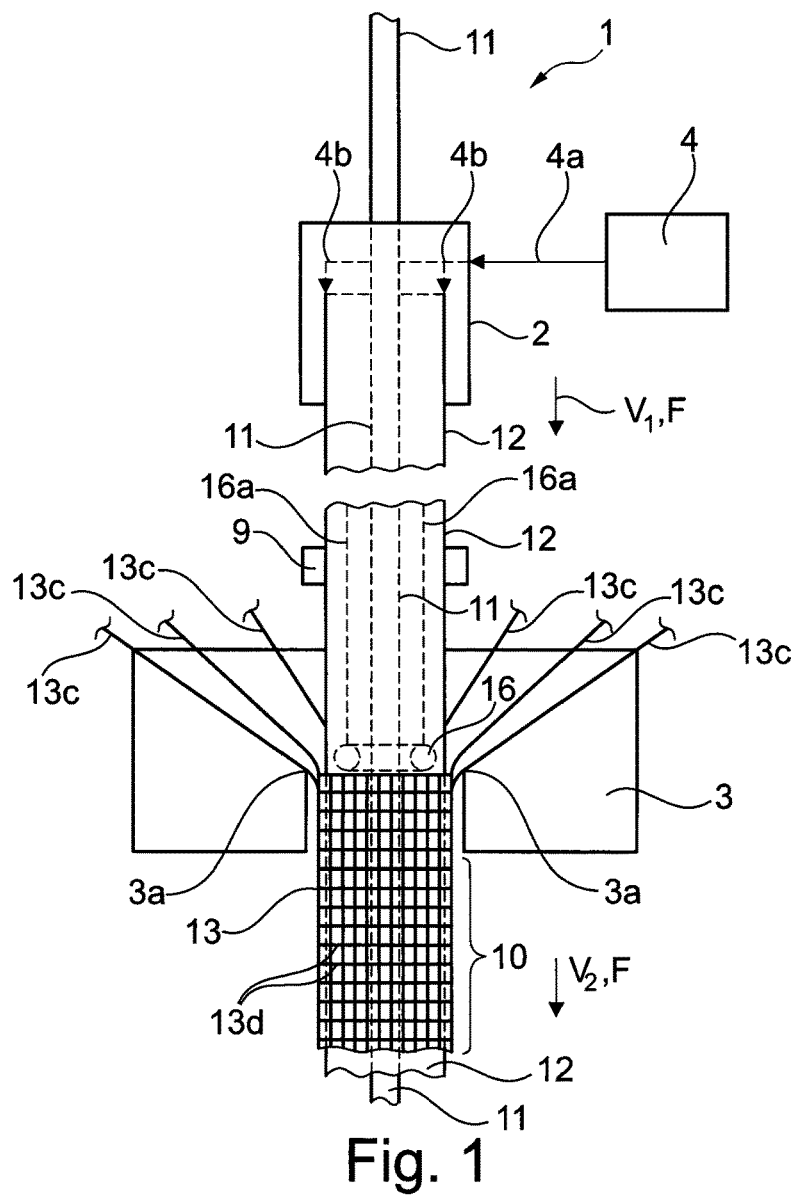
FIG. 1 shows a schematic illustration of a device for producing a continuous semifinished product.

FIG. 1 shows a schematic illustration of a device 1 for producing a continuous semifinished product 10. Inside an extrusion device 2, which is schematically illustrated, a silicone hose 12 is produced in a manner known per se from a silicone which is supplied from a silicone reservoir vessel 4 via inlets 4a, 4b. The silicone hose 12 is at that moment inflated by injecting air and subsequently the inflated hose is vulcanized. If the silicone hose 12 were to have a hole during his production process, this would prevent the inflation and the hose would collapse. Consequently, during the production process, it can be easily checked, for example using arranged sensors, whether the silicone hose at most has leakage points, and/or it can be ensured that the silicone hose is fluid-tight. This production method thus ensures that the wall of the silicone hose 12 does not have any permeable points. As illustrated in FIG. 1, an inner conductor 11 is additionally supplied to the extrusion device 2 in such a way that said inner conductor extends along the interior space of the silicone hose 12 produced. The inner conductor 11 is, for example, a woven hose for supplying a fluid into the interior space of the silicone hose 12. The inner conductor 11 could, however, for example also be an electrical conductor, or could additionally for example comprise sensors, it being possible to return the measured data thereof to a control device via the electrical conductor. The silicone hose 12 is conveyed at a velocity $V_1$ in the conveying direction F.

The silicone hose 12 and the inner conductor 11 located therein is supplied to a circular loom 3, which is schematically illustrated, using a conveying device 9, which is schematically illustrated. The circular loom 3 interweaves a plurality of supplied warp threads 13c with at least one weft thread 13d in a manner known per se, and therefore a tubular outer woven fabric is formed which forms the continuous fiber hose 13. The continuous fiber hose 13 encloses the silicone hose 12 completely in the circumferential direction, with the result that a tubular continuous semifinished product 10 comprising the inner conductor 11, the silicone hose 12 and the continuous fiber hose 13 leaves the circular loom 3 in the conveying direction F at a conveying velocity $V_2$.

Figure 2:
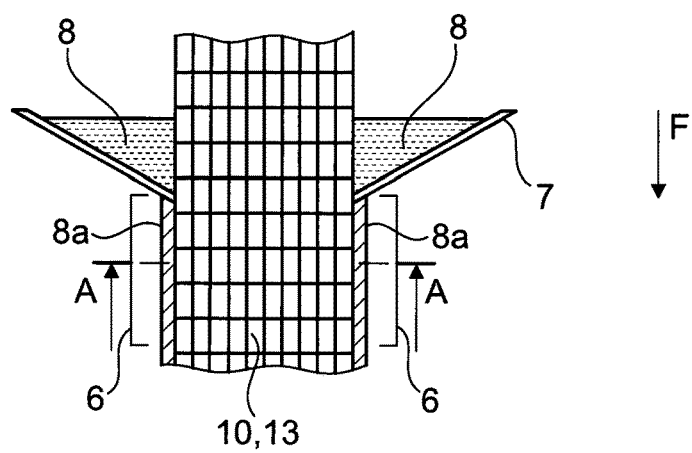
FIG. 2 shows a schematic view of a detail of a device for coating the outside.

As illustrated in FIG. 2, subsequently a coating material 8 located in a dip tank 7 is applied to the outer side of the continuous fiber hose 13 and completely encloses the outer side of the continuous fiber hose 13. The originally liquid coating material 8 is bonded here to the fibers of the continuous fiber hose 13 and subsequently hardens to form a surface coating 8a, the coating material 8 being selected in such a way that it nevertheless remains elastic and flexible after the hardening. A silicone is preferably used as the coating material 8. The continuous fiber hose 13 and/or the tubular continuous semifinished product 10 is illustrated only schematically in FIG. 2, and the surface coating 8a is illustrated as being considerably thicker than it is in reality for better illustration.

Figure 3:
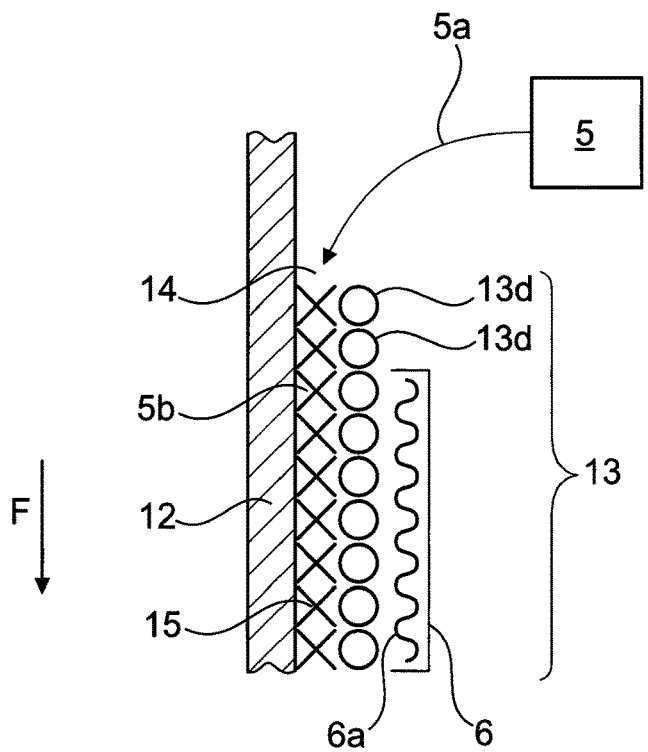
FIG. 3 shows a schematic view of a detail of a longitudinal section through a silicone hose and an outer woven fabric during the mutual bonding process.

FIG. 3 schematically shows a longitudinal section through the silicone hose 12 and the continuous fiber hose 13, said silicone hose and said continuous fiber hose being located in the circular loom 3, and the uppermost weft thread 13d representing the most current weft thread 13d introduced by the circular loom 3. The external diameter of the continuous fiber hose 13 is substantially determined by the internal diameter of the funnel-shaped circular loom 3 at the edge 3a thereof. In the region of this edge 3a, as illustrated in FIG. 1, the silicone hose 12 is inserted into the continuous fiber hose 13 which is obtained in the region of the edge 3a. In the process, as illustrated in FIG. 3, a gap 14 is formed between the continuous fiber hose 13 and the silicone hose 12. In a particularly advantageous configuration, the silicone hose 12 is spread at least in the region of the edge 3a, in order to keep the gap 14 predictably wide. Proceeding from a second reservoir vessel 5, a matrix material, preferably silicone, is supplied via a feed line 5a to the gap 14 in a manner distributed over the entire circumferential direction, the silicone hose 12 and the continuous fiber hose 13 being conveyed in the conveying direction F, and in the process being supplied to a crosslinking device 6 having an infrared heater 6a. In the process, the bonding agent 5b, which adheres to the outer surface of the silicone hose 12 and to the internal surface of the continuous fiber hose 13, and/or the matrix material supplied is hardened, and therefore the silicone hose 12 and the continuous fiber hose 13 are bonded to one another after the hardening, and advantageously are bonded or adhesively bonded to one another over the entire surface area and along the entire circumferential surface. In an advantageous embodiment, the woven fabric of the continuous fiber hose 13 consists at least partially and advantageously completely of polyester fibers. The crosslinking device 6 heats this woven fabric, for example to a temperature in the range of 120° C., as a result of which the polyester and/or the woven fabric manufactured with polyester fibers shrinks, and therefore the woven fabric in this phase approaches the silicone hose from the outside, so that the woven fabric and the silicone hose come into mutual contact at least at certain points and are mutually adhesively bonded by way of the matrix material. FIG. 3 does not illustrate in detail this gap reduction effect, which proceeds along the crosslinking device 6 in the conveying direction F, and the reduction in diameter of the continuous fiber hose 13.

FIG. 1 schematically shows an exemplary embodiment of a spreading device 16, which is arranged inside the silicone hose 12 and has a plurality of rolls distributed over the circumference which bear and/or can bear against the inner side of the silicone hose 12 in order to spread the silicone hose 12 from the inside. The spreading device 16 is connected to a holding device, not illustrated, via a suspension 16a. It is advantageously possible to vary and to set the location of the spreading device 16 in the running direction of the silicone hose 12, preferably in such a way that the spreading device 16 is located in the region of the edge 3a, and as a result it is possible to set the width of the gap 14 and preferably also the form of the gap 14 that runs in the conveying direction F.

Figure 4:
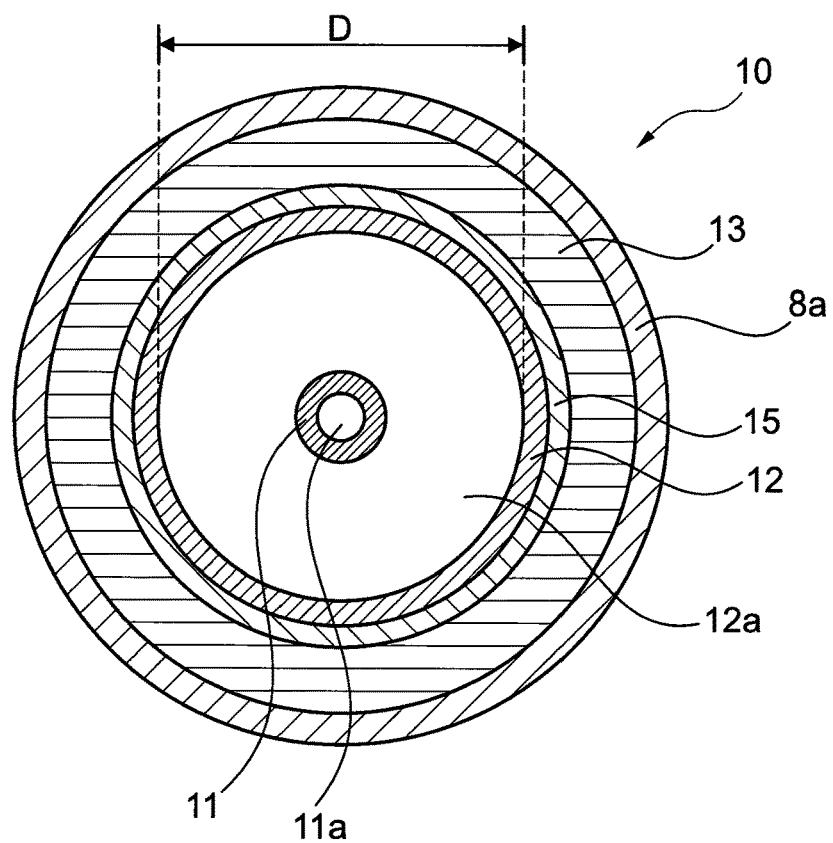
FIG. 4 shows a cross section through FIG. 2 along the sectional line A-A.

FIG. 4 schematically shows a cross section of the finished continuous semifinished product 10 along the sectional line A-A illustrated in FIG. 2. The silicone hose 12 has a first internal cavity 12a. The inner conductor 11 is arranged in a manner running inside the first internal cavity 12a and has a second internal cavity 11a. The continuous fiber hose 13 and the silicone hose 12 are bonded to one another by way of the bonding layer 15. The continuous fiber hose 13 additionally has a surface coating 8a. The silicone hose 12 has an internal diameter D. In an advantageous configuration, the internal diameter D lies in a range of between 10 cm and 100 cm depending on the field of use of the continuous semifinished product 10. In the schematically illustrated cross section according to FIG. 4, the elements silicone hose 12, inner conductor 11, composite layer 15, continuous fiber hose 13 and surface coating 8a are illustrated as being considerably thicker than they are in reality for better clarity.

FIG. 1 illustrates the production of the silicone hose 12 and the production of the continuous semifinished product 10 in succession. In one possible method, said silicone hose and continuous semifinished product can be produced immediately in succession. In an advantageous method, the silicone hose 12 is produced in a first method step, and after this the silicone hose 12 and the inner conductor 11 arranged therein are temporarily stored, for example by being wound up together onto a storage medium. In a second method step, the temporarily stored silicone hose 12 with the inner conductor 11 is supplied to the circular loom 3, and here the silicone hose 12 is encased with a continuous fiber hose 13 in the circumferential direction and bonded thereto. This division into two method steps has the advantage that different production speeds and/or different conveying velocities $V_1$, $V_2$ can be compensated for without problems by virtue of the temporary storage of the silicone hose 12 with the inner conductor 11. It is, however, also possible to operate the first and the second method step at the same conveying velocity, such that the silicone hose 12 produced by the extruder 2 can be returned directly to the circular loom 3, and a continuous production of the silicone hose 12 and the entire continuous semifinished product 10 is possible in this way.

Figure 5:
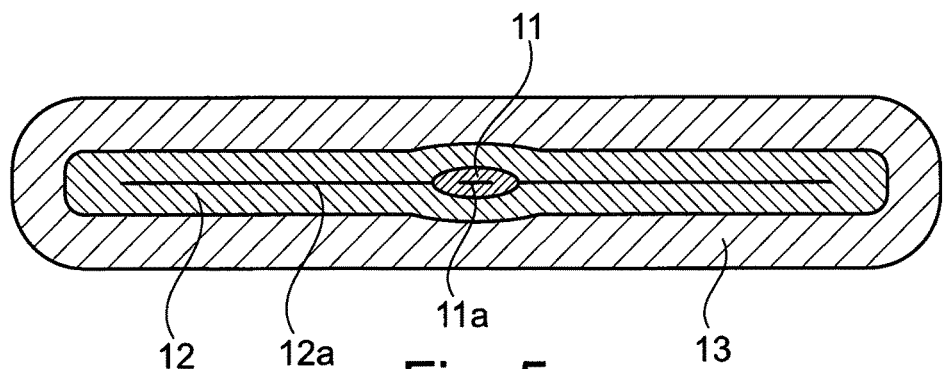
FIG. 5 shows a cross section through a continuous semifinished product which is arranged flat.
Figure 6:
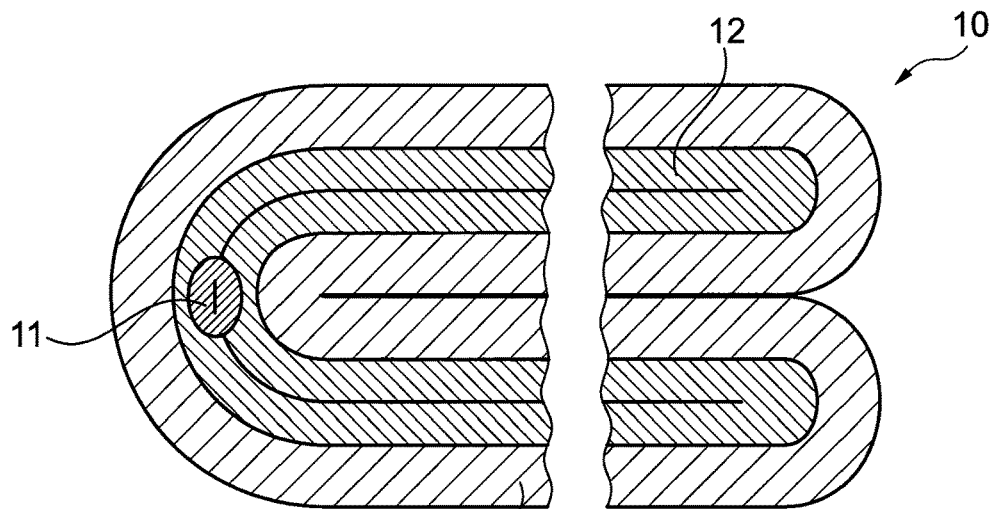
FIG. 6 shows a cross section through a folded continuous semifinished product.
Figure 7:
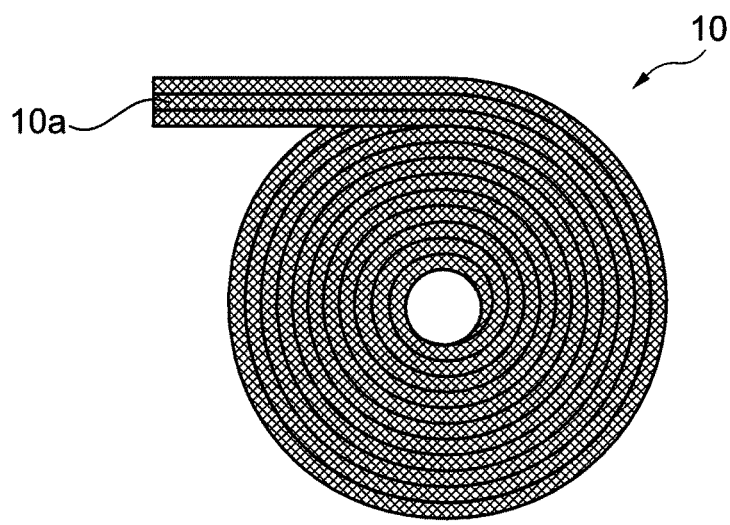
FIG. 7 shows a side view of a rolled-up continuous semifinished product.

After the production, the continuous semifinished product 10 is advantageously transferred into a flat state, as illustrated in FIG. 5, such that hardly any fluid or no fluid is located in the first internal cavity 12a of the silicone hose 12 and/or in the second internal cavity 11a of the inner conductor 11 any more. In a further advantageous method step, the continuous semifinished product 10 is folded at least once, as illustrated in FIG. 6, and subsequently rolled up onto a roll, as illustrated in FIG. 7. A downhole heat exchanger can then be produced in a simple manner in such a way that the continuous semifinished product is cut to a desired length of for example between 50 and 500 m, that a borehole with a corresponding length is produced, and that the tip 10a of the continuous semifinished product 10 which has been cut to length is provided with a fluid-tight closure, for example with what is known as a probe foot. Subsequently, the tip 10a, comprising the probe foot and additionally optionally a possible additional weight, is inserted and lowered into the borehole, until the continuous semifinished product 10 which has been cut to length is substantially lowered in the borehole. After the lowering operation, which is preferably complete, a pressurized fluid is supplied to the inner conductor 11, the consequence of which is that the continuous semifinished product which has been cut to length, in particular the silicone hose 12 and the continuous fiber hose 13 thereof, is unfolded in the borehole. Such an arrangement could already be used as a downhole heat exchanger. However, it is preferable if, after the unfolding in the borehole of the continuous semifinished product which has been cut to length, the inner conductor 11 is removed by being withdrawn, and introduced instead of the inner conductor 11 is a preferably rigid fluid line, which is advantageously thermally insulated with respect to the outside and preferably extends substantially from the inlet of the borehole as far as approximately the fluid-tight closure of the continuous semifinished product 10 which has been cut to length. The inlet of the borehole is understood for example to mean the point at which the borehole enters the ground. It is preferable if at least heat exchanging devices and fluid pumps are arranged in the region in front of the inlet of the borehole. During operation of the downhole heat exchanger, either a fluid that flows inside the fluid line and emerges from the fluid line at the end of the fluid line, preferably in the region of the fluid-tight closure, is supplied via the fluid line, the fluid subsequently flowing back again in the interior space 12a formed between the fluid line and the silicone hose 12 substantially to the inlet of the borehole. The fluid can of course also flow in the opposite direction by the fluid being supplied to the interior space 12a substantially in the region of the inlet of the borehole and preferably flowing as far as the region of the fluid-tight closure within the silicone hose 12, and in this region at the end of the fluid line enters the fluid line, and inside the fluid line is conducted again substantially to the region of the inlet of the borehole.

In an advantageous configuration, the continuous semifinished product and/or the downhole heat exchanger comprises a silicone hose 12 having a first interior space 12a, comprises a separate inner conductor 11 which runs inside the first interior space 12a, and comprises a continuous fiber hose 13 enclosing the silicone hose 12 on the outside, the silicone hose 12 and the continuous fiber hose 13 being bonded to one another by a hardened matrix material.

In an advantageous configuration, the continuous semifinished product is prefabricated in such a way that it has a particular length, and that that end of the continuous semifinished product which is to be lowered into the borehole has a fluid-tight closure in that the silicone hose 12 forms a fluid-tight end and in that the end of the continuous fiber hose 13 preferably has an end face which covers the fluid-tight end of the silicone hose 12. It is preferable if a plurality of continuous semifinished products of this type having different lengths are provided, so that a continuous semifinished product with a matching length can be selected from the plurality of continuous semifinished products, depending on a respective borehole depth.

The invention claimed is:

1. A method for producing a continuous semifinished product, which comprises:
    supplying a silicone hose and a separate inner conductor in a first step, wherein the inner conductor runs in a first interior space formed by the silicone hose, wherein the silicone hose is produced by extrusion and wherein the separate inner conductor is introduced into the first interior space formed by the silicone hose;
    subsequently in a second step after the first step, encasing the silicone hose by producing a continuous fiber hose that encloses the silicone hose and the separate inner conductor on the outside;
    spreading open the silicone hose by a mechanical spreading device comprising a plurality of rolls distributed over a circumference which can bear against an inner side of the silicone hose, so that a gap is reduced between the silicone hose and the continuous fiber hose;
    supplying a matrix material into the gap; and
    bonding the silicone hose and the continuous fiber hose by hardening the matrix material.

2. The method as claimed in claim 1, wherein the continuous fiber hose is produced by weaving on a circular loom.

3. The method as claimed in claim 2, wherein the continuous fiber hose comprises thermoplastic continuous fibers.

4. The method as claimed in claim 3, wherein the silicone hose and the continuous fiber hose are bonded to one another by heating at least the continuous fiber hose,
    with the result that the thermoplastic continuous fibers of the continuous fiber hose shrink, the gap is reduced as a result, and the matrix material is hardened.

5. The method as claimed in claim 3, wherein the fibers comprises at least one of the following fibers: polyester, polyamide, polyethylene and aramid.

6. The method as claimed in claim 1, wherein a liquid coating material is applied in an annular manner to the outer side of the continuous fiber hose which moves in a conveying direction (F), and in that the liquid coating material is subsequently hardened.

7. A device for producing a continuous semifinished product, comprising:
    a conveying device for supplying a silicone hose and a separate inner conductor arranged inside the silicone hose, wherein the inner conductor runs in a first interior space formed by the silicone hose, wherein the silicone hose is produced by extrusion and wherein the separate inner conductor is introduced into the first interior space formed by the silicone hose;
    a bonding device for bonding a plurality of fibers to form a continuous fiber hose, and for encasing the silicone hose with the continuous fiber hose, the continuous fiber hose enclosing the silicone hose and the separate inner conductor on the outside;
    a mechanical spreading device, comprising a plurality of rolls distributed over a circumference which can bear against an inner side of the silicone hose, for opening out the silicone hose so that a gap is reduced between the continuous fiber hose and the silicone hose;
    a supplying device for supplying a liquid bonding agent into the gap; and
    a crosslinking device for crosslinking the bonding agent and for bonding the silicone hose to the continuous fiber hose.

8. The device as claimed in claim 7, comprising:
    an extrusion device for producing the silicone hose and for inserting the inner conductor into the silicone hose.

9. The device as claimed in claim 7, wherein the bonding agent comprises silicone, polyurethane or polyurea.

* * * * *